US012698834B2

(12) United States Patent
Stroeken et al.

(10) Patent No.: US 12,698,834 B2
(45) Date of Patent: Aug. 4, 2026

(54) VALVE

(71) Applicant: Weir Minerals Netherlands B.V., PH Venlo (NL)

(72) Inventors: Johannes Stroeken, JS Roermond (NL); Frank Ummenthun, VH Venlo (NL)

(73) Assignee: Weir Minerals Netherlands B.V., PH Venlo (NL)

( * ) Notice: Subject to any disclaimer, the term of this patent is extended or adjusted under 35 U.S.C. 154(b) by 0 days.

(21) Appl. No.: 18/845,851

(22) PCT Filed: Mar. 28, 2023

(86) PCT No.: PCT/IB2023/053054
§ 371 (c)(1),
(2) Date: Sep. 10, 2024

(87) PCT Pub. No.: WO2023/194844
PCT Pub. Date: Oct. 12, 2023

(65) Prior Publication Data
US 2025/0180124 A1      Jun. 5, 2025

(30) Foreign Application Priority Data

Apr. 4, 2022      (GB) ..................................... 2204876

(51) Int. Cl.
F16K 1/38          (2006.01)
F16K 1/46          (2006.01)
F16K 1/54          (2006.01)
(52) U.S. Cl.
CPC ............... F16K 1/385 (2013.01); F16K 1/46 (2013.01); F16K 1/54 (2013.01)

(58) Field of Classification Search
CPC ... F16K 1/385; F16K 1/46; F16K 1/54; F16K 1/443; F16K 47/023
See application file for complete search history.

(56) References Cited

U.S. PATENT DOCUMENTS 4,453,561 A * 6/1984 Sands ................... F16K 15/063
                                                                137/543.13
4,771,093 A * 9/1988 Nakane .................. C08J 7/0427
                                                                524/225
(Continued)

FOREIGN PATENT DOCUMENTS

DE            3001458 A1       7/1980
EP            2843272 A1       3/2015
(Continued)

*Primary Examiner* — Patrick C Williams

(74) *Attorney, Agent, or Firm* — Morriss O'Bryant Compagni Cannon, PLLC

(57) ABSTRACT

A valve (19.1) is described that includes: a flow path connecting a housing inlet (42) and outlet (44); a valve seat (48)) positioned in the flow path; a closure member (50) displaceable between a closed position and an open position; and a throttle element (52) displaceable together with the closure member. The throttle element comprises a front portion (70) of increasing cross-sectional area, a frusto-conical rear portion (72), and an intermediate portion (74) sufficiently long so that the intermediate portion enters a guide portion (49) of the flow path before a seal (56) makes contact with the valve seat. The throttle element is configured progressively to decrease the effective cross-sectional area of the flow path as the closure member is displaced form its open position towards its closed position.

7 Claims, 6 Drawing Sheets

(56) References Cited

U.S. PATENT DOCUMENTS

| 5,052,435 | A | * | 10/1991 | Crudup | ................ | F16K 15/063 |
| | | | | | | 251/332 |
| 5,332,000 | A | * | 7/1994 | Gassner | ............. | F16K 17/0466 |
| | | | | | | 251/333 |
| 5,901,743 | A | * | 5/1999 | Schulz | ................. | F16K 15/063 |
| | | | | | | 137/540 |
| 6,006,782 | A | * | 12/1999 | Felton | ................... | F16K 15/026 |
| | | | | | | 137/538 |
| 7,036,523 | B2 | * | 5/2006 | Nixon | .................. | F16K 15/063 |
| | | | | | | 137/454.5 |
| 7,364,412 | B2 | * | 4/2008 | Kugelev | ............ | F04B 53/1032 |
| | | | | | | 417/454 |
| 2002/0036015 | A1 | * | 3/2002 | Miyajima | ............... | F16L 33/30 |
| | | | | | | 137/543.23 |
| 2010/0038573 | A1 | | 2/2010 | Lucas | | |

FOREIGN PATENT DOCUMENTS

| EP | 3967907 | A1 | 3/2022 |
| JP | H0536171 | U | 5/1993 |
| WO | 2020016716 | A2 | 1/2020 |

* cited by examiner

VALVE

FIELD OF INVENTION

This invention relates to a valve and to a method of operating a valve. More particularly, it relates to a valve and to a pressure exchange chamber ("PEC") pumping system using that valve. It further relates to a PEC pumping system kit and to a valve closure unit.

BACKGROUND OF THE INVENTION

Sometimes when valves are used to regulate the flow of medium, particularly where there is a need for rapidly stopping fluid flowing at high velocities, substantial shock loads can be experienced when the valve is closed. Under certain circumstances these shock loads can be so severe that they can damage the integrity of the system of which the valve forms part.

One application where this potentially can occur is in a PEC pumping system. A PEC pumping system typically includes one or more pipes, each having a medium or pumped fluid valve arrangement at one end and a driving fluid valve arrangement at the other end. The combination of each pipe and its associated valves comprises a PEC.

Operating a PEC involves rapidly changing the pressure inside the PEC, which means that conventional means for preventing shock loads (also known as a water hammer), such as a gas dampener, cannot be used.

A shock load may occur in a PEC, for example, once the medium has been discharged therefrom and the medium outlet valve and driving fluid inlet valve close before the medium inlet valve and the driving fluid outlet valve open to charge the PEC. By virtue of the high flow velocity of the driving fluid, closure of the driving fluid inlet valve (which stops the fluid flow) can result in substantial hydraulic shock or pressure surges with potentially damaging consequences.

There are many other applications where valves are used to stop fluid flowing at high velocities where this problem could potentially occur.

It is among the objects of an embodiment of this invention to provide means which may at least ameliorate this problem or provide a useful alternative.

SUMMARY OF THE INVENTION

This summary is provided to introduce a selection of concepts that are further described in the detailed description below. This summary is not intended to identify indispensable features of the claimed subject matter, nor is it intended for use as an aid in limiting the scope of the claimed subject matter.

In this application ordinal numbers (first, second, third, etc.) are assigned arbitrarily herein, and are used to differentiate between parts, and do not indicate a particular order, sequence, or importance. Features described as options with respect to one aspect are intended to be applicable as options to all other aspects, where possible.

According to a first aspect of the invention there is provided a valve comprising: a housing; an inlet leading into the housing; an outlet leading from the housing at a position spaced from the inlet; a flow path connecting the inlet and the outlet in flow communication; a valve seat positioned in the flow path and comprising a frusto-conical portion having a wide end and a longitudinally spaced narrow end; a guide portion extending away from the narrow end of the frusto-conical portion coaxially therewith; a closure member displaceable between a closed position inhibiting the flow of medium through the flow path and an open position permitting the flow of medium through the flow path; and a throttle element displaceable together with the closure member, and being inserted into the guide portion when the closure member is displaced towards its closed position, the throttle element including (i) a front portion, the cross-sectional area of which increases away from a leading end of the throttle element for at least part of the length thereof, (ii) a frusto-conical rear portion complementary to the valve seat, and (iii) an intermediate portion extending between the front portion and the rear portion and being sufficiently long so that the intermediate portion enters the guide portion of the flow path before the seal makes contact with the valve seat, thereby regulating the effective cross-sectional area of the flow path as the closure member is displaced from its open position towards its closed position and reducing shock loads by progressively decreasing the cross-sectional area of the flow path.

The valve closure member optionally includes an elastomeric seal having a frusto-conical seal surface which, in the closed position abuts sealingly against the valve seat.

The guide portion may define a circular cross-section, an elliptical cross-section, a polygon cross-section, or any other convenient shape.

The valve may comprise an actuated valve, and may include an actuator for displacing the closure member between its open and closed positions.

The valve seat may be annular and arranged around the flow path such that the flow path extends (or passes) therethrough.

The valve seat may comprise a surface of the housing, which may be hardened (e.g. by a coating or infiltration of a hard material), or an insert.

The throttle element preferably extends through the valve seat and into a portion of the flow path adjacent thereto thereby progressively decreasing the area between the side of the flow path and the throttle element and effectively decreasing the cross-sectional area of the flow path.

The seal may be secured to and be displaceable with the throttle element, the seal being positioned adjacent to and protruding radially beyond the rear portion of the throttle element such that the seal surface of the seal makes contact with the valve seat before the rear portion of the throttle element. The seal may comprise an elastomeric material.

The dimensions of the closure member may be selected to achieve the desired throttling profile. In one embodiment, the intermediate portion of the closure member has a diameter which is between 0.5 and 1 mm less than the diameter of the guide portion of the flow path.

The guide portion may have a circular cylindrical shape. Alternatively, the guide portion may have a different shape.

According to a second aspect of the invention there is provided a PEC pumping system comprising: at least one PEC having a medium valve arrangement at one end thereof and a driving fluid valve arrangement at an opposite end thereof, at least one of the valve arrangements including at least one valve of the type described above.

In a preferred embodiment, at least a driving fluid inlet valve of the driving fluid valve arrangement is a valve of the type described above. Optionally, a driving fluid outlet valve of the driving fluid valve arrangement is a valve of the type described above.

The PEC pumping system may include a plurality of PECs arranged in parallel, and a feed arrangement which includes a feeder pump having a suction side and a discharge side connected in flow communication with the medium inlet valves.

The components of the PEC pumping system may be transported in a disassembled or knocked-down kit form for assembly at site.

Hence, according to a third aspect of the invention, there is provided a PEC pumping system kit comprising the parts of the second aspect.

According to a fourth aspect of the invention there is provided a method of reducing shock loads in a flow path for medium in a pressurised pumping system, the method comprising: (i) reducing an effective cross-sectional area of the flow path to throttle the medium flow; (ii) substantially closing the flow path after reducing the effective cross-sectional area thereof; (iii) elastomerically sealing the flow path only after substantially closing the flow path.

The method may be implemented using a profiled valve body and housing.

The step of reducing an effective cross-sectional area of the flow path to throttle the medium flow may be implemented by inserting a front portion of a throttle element into part of the flow path. The throttle element may have a leading end, a trailing end, and the front portion extends from the leading end towards the trailing end and has an increasing cross-sectional area for at least part of the length thereof.

The step of substantially closing the flow path after reducing the effective cross-sectional area thereof may be implemented by inserting an intermediate portion of the throttle element into a lower portion of the flow path, where the intermediate portion is only marginally smaller than a diameter of the lower portion of the flow path.

The intermediate portion may extend between the front portion and a rear portion.

The step of elastomerically sealing the flow path only after substantially closing the flow path may be implemented using an elastomeric seal mounted above and protruding laterally beyond a frusto-conical rear portion complementary to a valve seat. The lateral protrusion may comprise a radial protrusion.

By virtue of this aspect the throttling function is separated from, and precedes, the sealing function.

According to a fifth aspect of the invention there is provided a valve closure unit for use with a valve of the type described above which has a hollow housing defining a first opening, a second opening spaced from the first opening, a flow path connecting the first and second openings in flow communication, a valve seat provided in the flow path, the closure unit including a closure member which is configured to seat sealingly against the valve seat and a throttle element which has a leading end and a trailing end, a transverse cross-sectional area of the leading end of the throttle element being less than a transverse cross-sectional area of the trailing end, the throttle element being displaceable together with the closure member such that as the closure member is displaced towards its closed position, the throttle element extends through the valve seat and into a portion of the flow path adjacent thereto thereby progressively decreasing the area between the side of the flow path and the throttle element and effectively progressively decreasing the cross-sectional are of the flow path.

According to a sixth aspect of the invention there is provided a valve comprising: a housing; an inlet leading into the housing; an outlet leading from the housing at a position spaced from the inlet; a flow path connecting the inlet and the outlet in flow communication and including a frusto-conical portion having a wide end and a longitudinally spaced narrow end and a circular cylindrical portion extending away from the narrow end of the frusto-conical portion coaxially therewith; a valve seat positioned in the flow path and comprising the frusto-conical portion; a closure member which is displaceable between a closed position in which it seats against the valve seat to inhibit the flow of medium through the flow path and an open position in which it permits the flow of medium through the flow path, the closure member including an elastomeric seal having a frusto-conical seal surface which, in the closed position abuts sealingly against the valve seat; and a throttle element which has a leading end and a trailing end, a transverse cross-sectional area of the leading end of the throttle element being less than a transverse cross-sectional area of the trailing end, the throttle element being displaceable together with the closure member, and being inserted into the circular cylindrical portion when the closure member is displaced towards its closed position, the throttle element including (i) a front portion, the cross-sectional area of which increases away from the leading end for at least part of the length of the throttle element, (ii) a rear portion which is frusto-conical in shape and is complementary to the valve seat, and (iii) an intermediate portion extending between the front portion and the rear portion and which is circular cylindrical in shape, wherein the length of the intermediate portion of the throttle element is sufficiently long so that the intermediate portion enters the circular cylindrical portion of the flow path before the seal makes contact with the surface of the valve seat; thereby regulating the effective cross-sectional area of the flow path as the closure member is displaced from its open position towards its closed position and to reduce shock loads by progressively decreasing the area between the side of the flow path and the throttle element and effectively decreasing the cross-sectional area of the flow path.

BRIEF DESCRIPTION OF THE DRAWINGS

These and other aspects of the invention will now be described, by way of example, with reference to the accompanying diagrammatic drawings, in which.

DETAILED DESCRIPTION OF EMBODIMENTS

Figure 1:
FIG. 1 shows a schematic view of a PEC pumping system in accordance with an embodiment of the invention.
Figure 1:
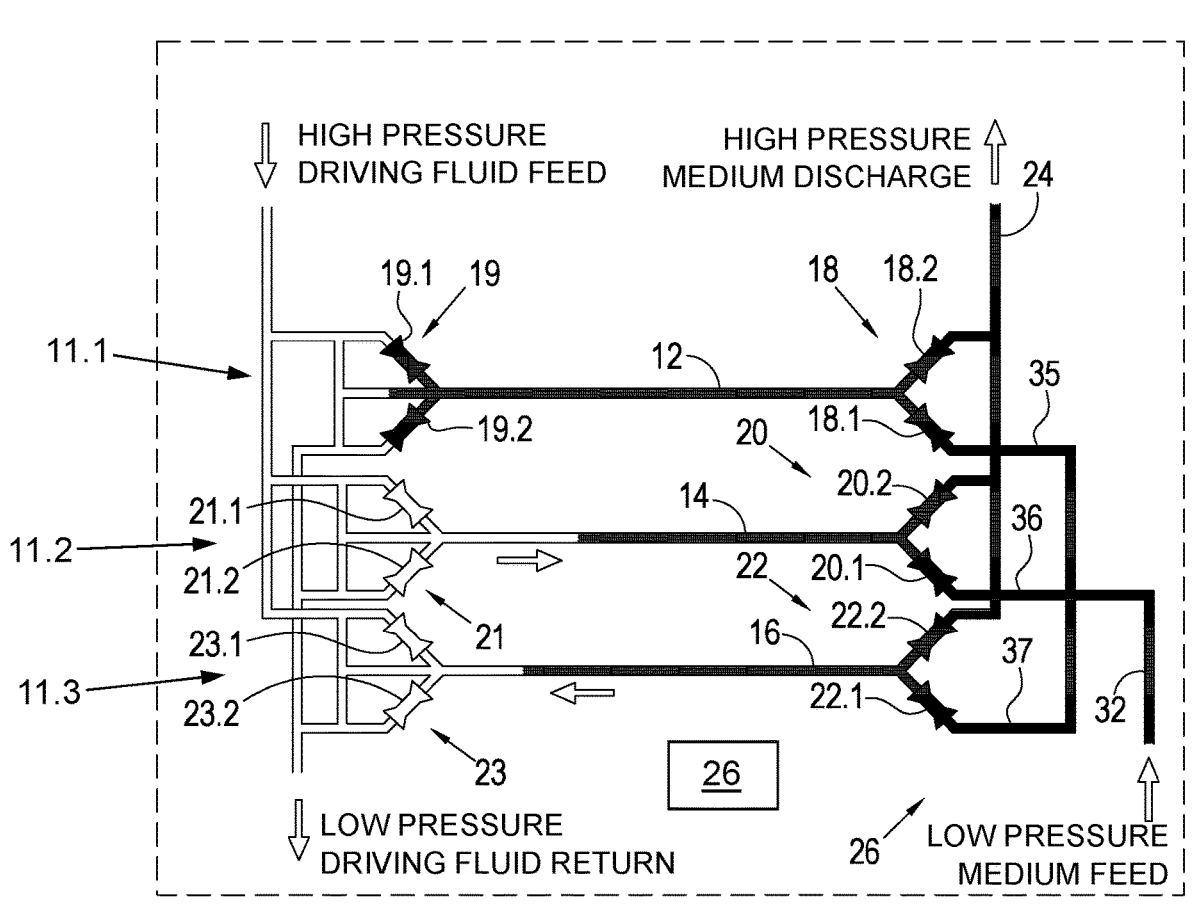
Figure 3:
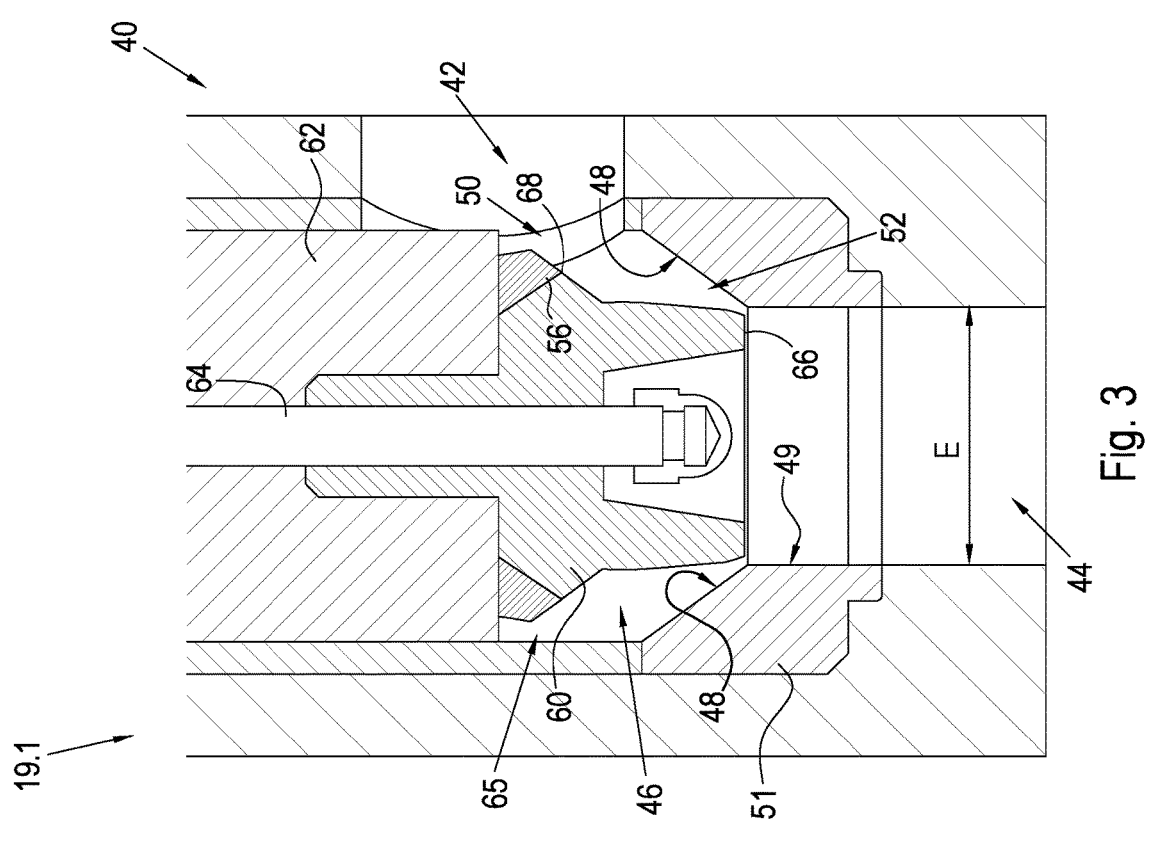
FIGS. 3 to 7 show sectional views of the valve of FIG. 2 and illustrate sequentially the displacement of a closure member of the valve from a partially open position shown in FIG. 2 of the drawings to its closed position shown in FIG. 7 of the drawings.
Figure 2:
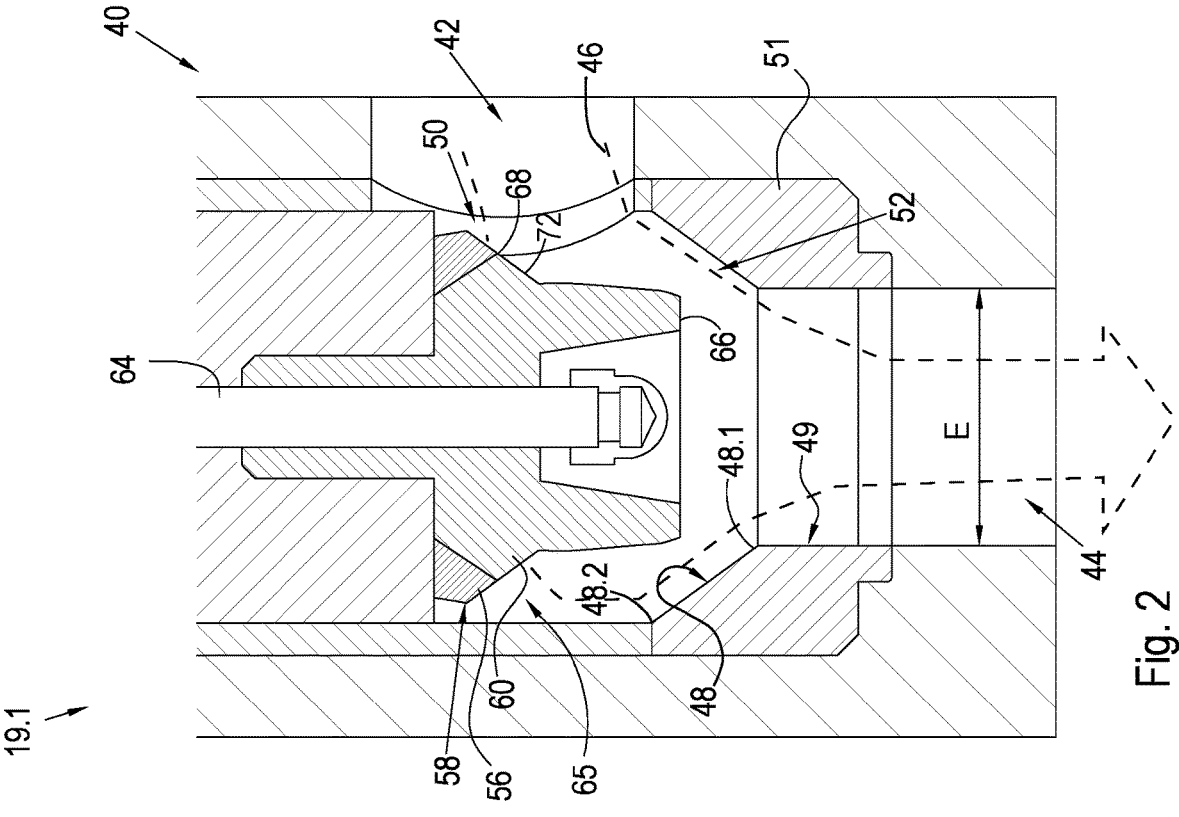
FIG. 2 shows an axial sectional view of part of a valve in accordance with another embodiment of the invention, the valve forming part of the PEC pumping system of FIG. 1.
Figure 5:
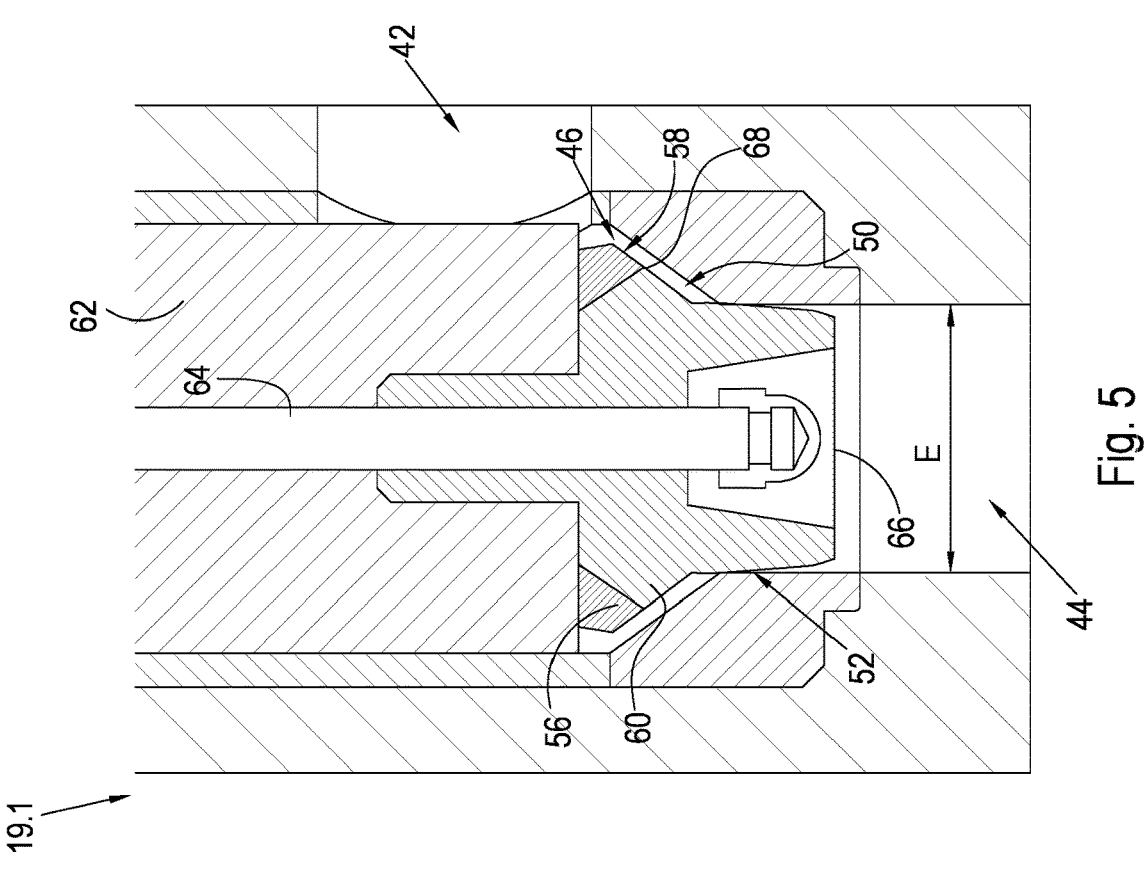
Figure 4:
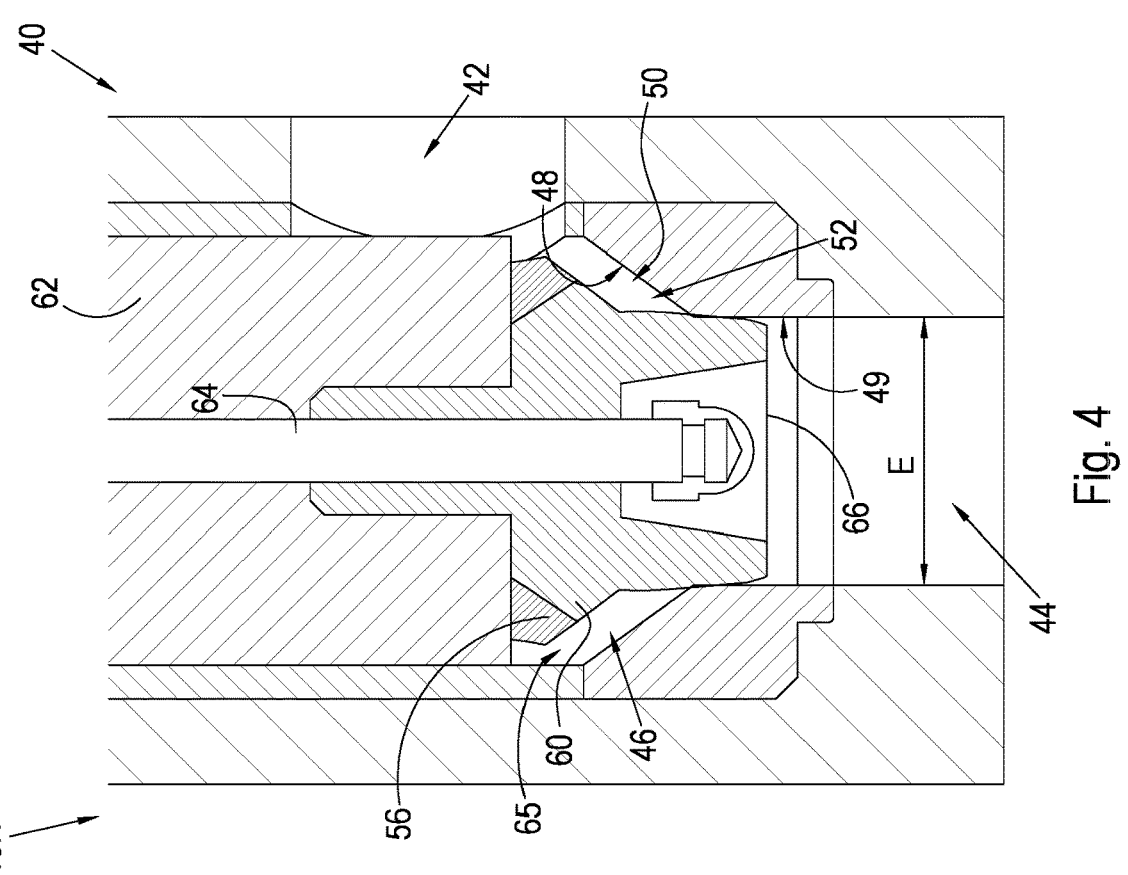
Figure 7:
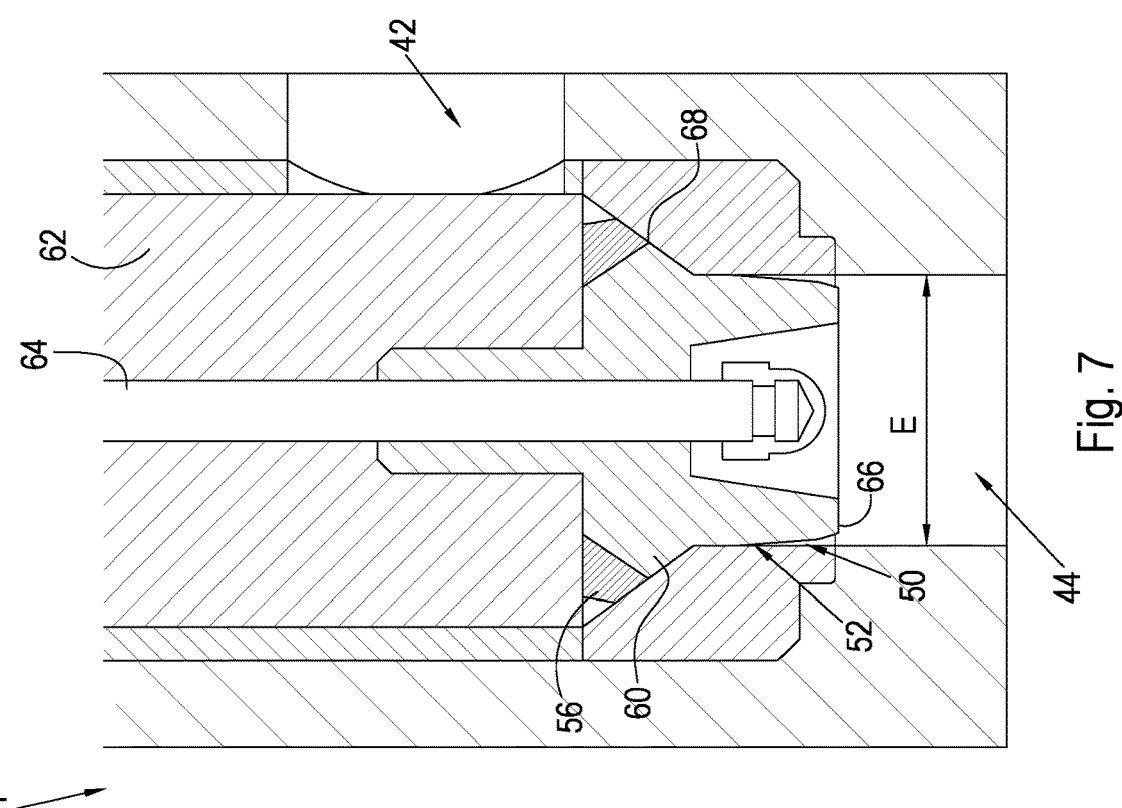
Figure 6:
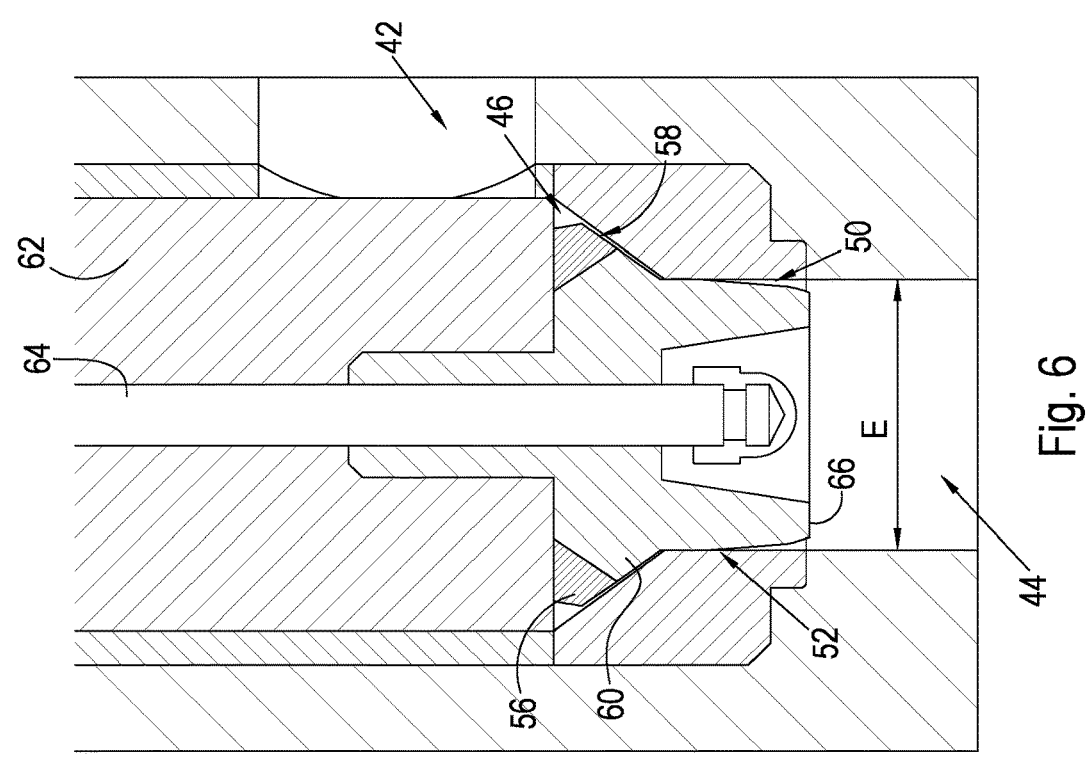
Figure 8:
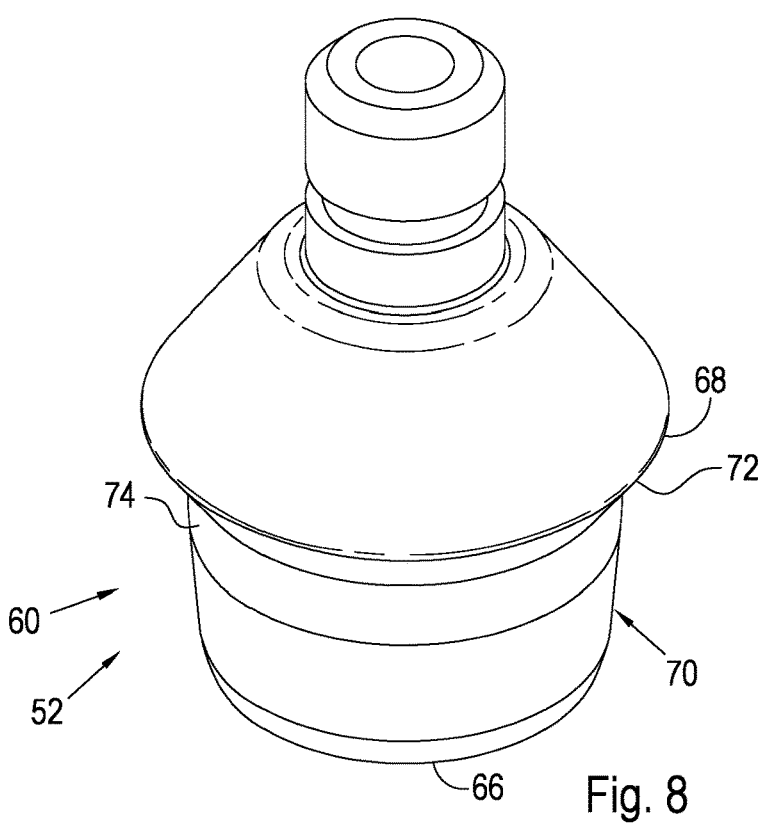
FIG. 8 shows a three-dimensional view of part of the closure member of the valve of FIG. 2.
Figure 9:
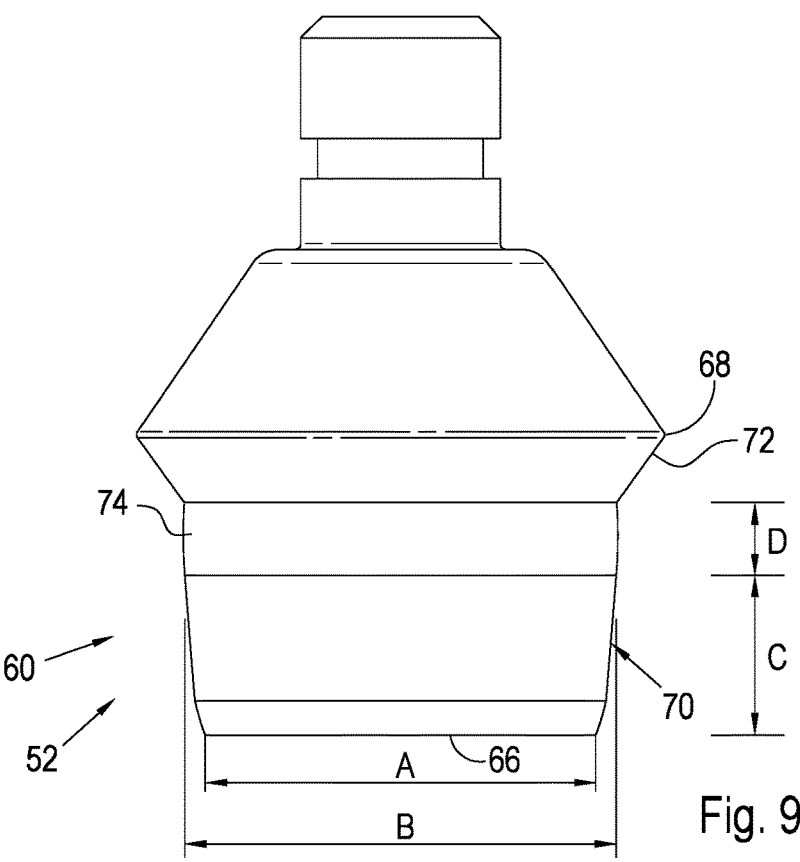
FIG. 9 shows a side view of the part of the closure member shown in FIG. 8.

In FIG. 1 of the drawings, reference numeral 10 refers generally to part of a PEC pumping system in accordance with an embodiment of the invention.

The PEC pumping system 10 includes three (PECs) 11.1, 11.2, 11.3 each defined by a fluid container, which in this embodiment comprises a length of pipe 12, 14, 16 having a medium or pumped fluid valve arrangement 18, 20, 22 connected respectively to one end thereof, and a driving fluid valve arrangement 19, 21, 23 connected respectively to an opposite end thereof. In this embodiment, the pipes 12, 14, 16 extend longitudinally, but other configurations are possible.

Each medium valve arrangement 18, 20, 22 includes a medium inlet valve 18.1, 20.1, 22.1 whereby medium to be pumped can be admitted into the associated pipe 12, 14, 16 and a medium outlet valve 18.2, 20.2, 22.2 whereby pumped medium can be discharged from the pipe 12, 14, 16 along a discharge pipe (or riser) 24. Similarly, each driving fluid valve arrangement 19, 21, 23 includes an inlet valve 19.1, 21.1, 23.1, in accordance with an embodiment of the invention, through which a high-pressure driving fluid can be admitted into the associated pipe and an outlet valve 19.2, 21.2, 23.2 whereby driving fluid can be discharged from the associated pipe.

The PEC pumping system 10 further includes a feed arrangement, part of which is generally indicated by reference numeral 26, configured to feed medium to be pumped to the medium inlet valves 18.1, 20.1, 22.1. The feed arrangement 26 includes a feed or delivery pump (not shown) having a suction side and a discharge side. The feeder pump is typically a centrifugal pump. The feed arrangement 26 further includes a pipe 32 which is connected to a source of medium and three feed lines 35, 36, 37 each of which has an upstream end connected to the pipe 32 and a downstream end. The downstream ends of the feed lines 35, 36, 37 are connected, respectively, to the medium inlet valves 18.1, 20.1, 22.1. In use, medium to be pumped is transported through the pipe 32 and the feed lines 35, 36, 37 to the medium inlet valves 18.1, 20.1, 22.1.

In use, with the medium inlet valve 18.1, 20.1, 22, 1 open and the corresponding driving fluid outlet valve 19.2, 21.2, 23.2 open, medium enters the associated pipe 12, 14, 16 and displaces the driving fluid out of the pipe through the associated driving fluid outlet valve 19.2, 21.2, 23.2. When a desired quantity of medium has entered the pipe, the medium inlet valve and driving fluid outlet valve are closed. The medium outlet valve 18.2, 20.2, 22.2 and the driving fluid inlet valve 19.1, 21.1, 23.1 are opened such that high-pressure driving fluid enters the pipe and displaces the medium out of the pipe through the medium outlet valve 18.2, 20.2, 22.2 and into the discharge pipe 24.

Once the medium has been discharged from the pipe, the associated medium outlet valve and driving fluid inlet valve close and the medium inlet valve and driving fluid outlet valve open to charge the pipe with medium once again in the manner described above.

To permit more or less continuous pumping, the operation of the valves of the different PECs 11.1, 11.2, 11.3 is staggered such that the filling of the PECs 11.1, 11.2, 11.3 with medium and the discharge of medium occurs in a more or less continuous basis.

Each of the driving fluid inlet valves 19.1, 21.1, 23.1 is substantially identical. In the interests of brevity of description, only the driving fluid inlet valve 19.1 is described in detail herebelow. In one embodiment of the invention, the driving fluid outlet valves 19.2, 21.2, 23.2 are of similar configuration to the driving fluid inlet valves 19.1, 21.1, 23.1 and accordingly the below description of the valve 19.1 applies also to the valves 19.2, 21.2, 23.2.

Referring now to FIGS. 2 to 10 of the drawings, the valve 19.1 includes a housing, part of which is shown in the drawings and is generally indicated by reference numeral 40. An inlet 42 leads into the housing 40, an outlet 44 leads from the housing 40 at a position spaced from the inlet and a flow path, the main part of which is generally indicated by broken arrow 46, extends through the housing 40 and connects the inlet 42 and outlet 44 in flow communication, as described in more detail herebelow. Arrow 46 illustrates flow in one direction; in other embodiments, the flow may be in the opposite direction to that shown by arrow 46.

The valve 19.1 further includes a valve seat, generally indicated by reference numeral 48, which is positioned between the inlet 42 and outlet 44 and a closure member, generally indicated by reference numeral 50 which is displaceable between a closed position (shown in FIG. 7 of the drawings), in which it inhibits the flow of medium through the flow path 46 and an open position in which the inlet 42 and outlet 44 are connected in flow communication to permit the flow of medium through the flow path 46. In one embodiment of the invention, the valve seat 48 may be formed by a hardened surface in the housing 40. In another embodiment, shown in the drawings, the valve seat 48 is formed by an insert 51, which facilitates replacement of a worn valve seat 48.

The valve 19.1 further includes a throttling arrangement, generally indicated by reference numeral 52 which is configured, as described in more detail herebelow, to decrease the effective cross-sectional area of the flow path 46 as the closure member 50 is displaced from its open position towards its closed position. When the closure member 50 is closed, another flow path in another valve has been opened so that the flow rate of medium through the valve 19.1 is reduced without creating any (or any significant) water hammer effect.

The housing insert 51 defines two portions of the flow path 46. The first portion is defined by the annular valve seat 48 which is frusto-conical in shape (extending from a narrow end 48.1 to a wide end 48.2, best seen in FIG. 2); and the second portion of the flow path 46 defined by the housing insert 51 is a guide portion 49, which in this embodiment is circular cylindrical in shape and is of the same diameter and extends away from the narrow end 48.1 of the valve seat 48. In this embodiment, the guide portion 49 is located at a lower portion of the flow path 46.

The closure member 50 includes an annular seal 56 which has a frusto-conical seal surface 58 which is complementary in shape to the surface of the valve seat 48. In this embodiment, the annular seal 56 comprises elastomeric material.

The throttling arrangement 52 includes a throttle element, generally indicated by reference numeral 60. The seal 56 is sandwiched between the throttle element 60 and an annular retaining member 62. An axially extending stud bolt 64 extends through the retaining member 62 and throttle element 60 and nuts (or other securing elements) are mounted on end portions of the stud bolt 64 to urge the throttle element 60 and retaining member 62 towards one another and thereby secure the seal 56 in position. The throttle element 60, seal 56 and retaining member 62 together form a valve closure unit, generally indicated by reference numeral 65.

The stud bolt 64 is typically connected to an actuator, e.g., a hydraulically actuated piston and cylinder arrangement (not shown) whereby the valve closure unit 65 is displaceable between an open position in which the seal 56 is clear of the valve seat 48 and a closed position in which the seal surface 58 is in abutment with the valve seat 48.

In this embodiment the closure member 50 and the throttle element 60 comprise two portions of a unitary component, but in other embodiments, separate components may be provided that are mutually coupled.

The throttle element 60 has a leading end 66 and a trailing end 68.

The throttle element 60 includes a front portion 70 (best seen in FIGS. 8 and 9), the diameter and hence the cross-sectional area of which increases away from the leading end 66 for part of the length of the throttle element 60. Further, the throttle element 60 includes a rear portion 72 which is frusto-conical in shape and the diameter of which decreases away from the trailing end 68 of the throttle element 60. The throttle element 60 includes an intermediate portion 74 which is circular cylindrical in shape (in this embodiment, in other embodiments it may have a different shape) and extends between the front and rear portions 70, 72. The rear portion 72 is complementary in shape to the valve seat 48. In particular the angle of the rear portion 72 is selected to ensure that there is a large contact area with the seat 48 (at least prior to any wear of the rear portion 72 or seat 48) when the valve closure unit 65 is in the closed position.

In use, when the closure member 50 is in its open or partially open position (shown in FIG. 2 of the drawings), the throttle element 60 is clear of the valve seat 48 permitting more or less unrestricted flow through the flow path 46 between the inlet 42 and the outlet 44. However, as the closure member 50 is displaced towards its closed position, the front portion 70 of the throttle element 60 enters the guide portion 49 of the flow path 46 effectively reducing the cross-sectional area of the flow path 46 and restricting the flow of the medium through the flow path 46. As the closure member 50 advances towards its closed position, the throttle element 60 is inserted further and further into the guide portion 49 and by virtue of the increasing diameter of the front portion 70 of the throttle element 60, the annular space between the throttle element 60 and the guide portion 49 is decreased progressively thereby decreasing the effective cross-sectional area of the flow path 46 and hence progressively decreasing the flow rate of medium through the valve 19.1. Hence, the throttle element 60 and the guide portion 49 together form the throttling arrangement 52.

Figure 10:
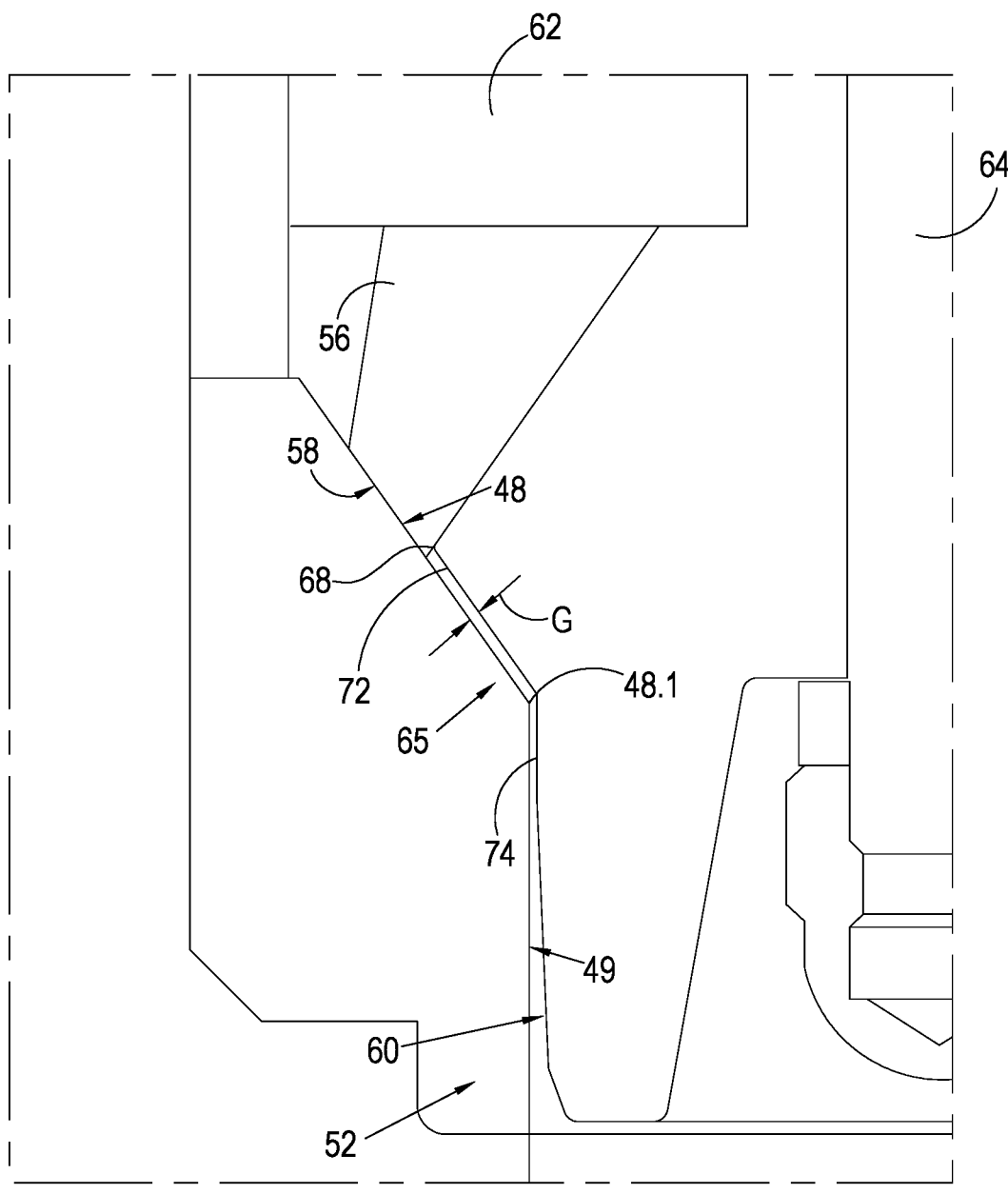
FIG. 10 shows, on an enlarged scale, part of the valve of FIG. 2.

As can best be seen in FIG. 10 of the drawings, the seal 56 protrudes radially beyond the frusto-conical surface of the rear portion 72 of the throttle element 60 such that as the closure member 50 approaches its closed position the seal surface 58 makes contact with the surface of the valve seat 48 before the throttle element 60. As indicated in FIG. 10 by the letter G the extent to which the seal protrudes beyond the frusto-conical surface of the throttle element is limited to approximately 1-4 mm to reduce the risk of extrusion of the seal 56 between the opposed surfaces of the throttle element 60 and the valve seat 48.

The circular cylindrical intermediate portion 74 of the throttle element 60 has a diameter which is only marginally smaller, e.g., of the order of 0.5-1 mm smaller, than the diameter of the circular cylindrical portion 49 of the flow path such that maximum throttling occurs as the intermediate portion 74 enters the circular cylindrical portion 49 of the flow path.

The rate at which the flow rate of medium is decreased can also be controlled by regulating the speed with which the closure member is displaced towards its closed position and/or changing the shape of the throttle element 60.

The specific dimensions of the valve will be selected to obtain a desired performance characteristic. Hence, as an example, in the embodiment shown, the guide portion 49 has a diameter E of 74 mm. The leading end 66 of the front portion 70 has a diameter A of 70 mm. The diameter B of the intermediate portion is typically between 0.5 and 1 mm less than E, i.e., 73-73.5 mm. The front portion 70 has a length C of 40 mm. The intermediate portion has a length D of 10 mm. Naturally, the size of the valve can vary depending on the intended application.

By progressively decreasing the cross-sectional area of the flow path 46 before the closure member 50 reaches its closed position, the risk of hydraulic shock in high flow rate applications is prevented.

By including a circular cylindrical portion 74 that is only slightly narrower than the guide portion 49 and extends axially, there is a defined length during which the cross sectional area is constant. This ensures that when the valve 19.1 is being closed there is a constant minimum cross-sectional area immediately prior to closing and sealing.

Although the valve described is a driving fluid inlet valve, it will be appreciated that the valve could be used in any other application, e.g., as a driving fluid outlet valve. Further, in other applications the direction of flow of medium through the valve could be in the opposite direction in which case the inlets and outlets would be reversed.

In other embodiments, the guide portion 49 may have a different shape to that described above. In other embodiments, the housing insert 51 may be an integral part of, and subsumed within, the housing 40, rather than a separate part.

It will be appreciated that a PEC pumping system could be constructed in the first instance in accordance with an embodiment of the invention. The components of the PEC pumping system could be transported in knocked down or kit form for assembly on site.

Alternatively, an existing PEC pumping system could be modified by replacing one or more of the valves with a valve in accordance with an embodiment of the invention.

LIST OF REFERENCE NUMERALS

Pressure exchange chamber (PEC) pumping system 10
PEC 11.1, 11.2, 11.3
Pipe 12, 14, 16
Medium valve arrangement 18, 20, 22
Medium inlet valve 18.1, 20.1, 22.1
Medium outlet valve 18.2, 20.2, 22.2
Driving fluid valve arrangements 19,21,23
Driving fluid inlet valve 19.1, 21.1, 23.1
Driving fluid outlet valve 19.2, 21.2, 23.2
Discharge pipe 24
Feed arrangement 26
Pipe 32
Feed line 35, 36, 37
Housing 40
Inlet 42
Outlet 44
Flow path 46
Valve seat 48
Valve seat narrow end 48.1
Guide (circular cylindrical) portion 49
Closure member 50
Housing insert 51
Throttling arrangement 52
Seal 56
Seal surface 58
Throttle element 60
Retaining member 62
Stud bolt 64
Valve closure unit 65
Leading end 66
Trailing end 68
Front portion 70
Rear portion 72

Intermediate portion 74
A diameter of leading end 66
B diameter of intermediate portion 74
C length of front portion 70
D length of intermediate portion 74
E diameter of guide portion 49
G seal protrusion

The invention claimed is:

1. An actuated valve comprising:
a housing;
an inlet leading into the housing;
an outlet leading from the housing at a position spaced from the inlet;
a flow path connecting the inlet and the outlet in flow communication;
a valve seat positioned in the flow path and comprising a frusto-conical portion having a wide end and a longitudinally spaced narrow end;
a guide portion extending away from the narrow end of the frusto-conical portion coaxially therewith;
a closure member; and
a throttle element displaceable together with the closure member, and being inserted into the guide portion when the closure member is displaced towards its closed position, the throttle element including
(i) a front portion, the cross-sectional area of which increases away from a leading end of the throttle element for at least part of the length thereof,
(ii) a frusto-conical rear portion complementary in shape to the valve seat, and
an intermediate portion extending between the front portion and the rear portion and being sufficiently long so that the intermediate portion enters the guide portion of the flow path before the seal makes contact with the valve seat,
wherein the closure member includes an elastomeric seal having a frusto-conical seal surface, the closure member and seal being displaceable between a closed position, in which the frusto-conical seal surface abuts sealingly against the valve seat inhibiting the flow of medium through the flow path, and an open position permitting the flow of medium through the flow path, the elastomeric seal is sandwiched between the throttle element and an annular retaining member and is positioned adjacent to and protruding radially beyond the rear portion of the throttle element such that the frusto-conical surface of the seal contacts the valve seat before the rear portion of the throttle element; and
the valve further comprises an axially extending stud bolt extending through both the annular retaining member and the throttle element and secured by a securing element on an end portion of the stud bolt to urge the throttle element and retaining member towards one another and thereby secure the elastomeric seal in position;
wherein as the closure member is displaced from its open position towards its closed position the increasing diameter of the front portion of the throttle element progressively decreases the annular space between the throttle element and the guide portion thereby progressively decreasing the effective cross-section area of the flow path and hence progressively decreasing the flow rate of medium through the valve to reduce shock loads.

2. The valve as claimed in claim 1, wherein the intermediate portion is adjacent the frusto-conical.

3. The valve as claimed in claim 1, in which the guide portion defines a circular cross-section.

4. The valve as claimed in claim 1, in which the intermediate portion of the closure member has a diameter which is between 0.5 and 1 mm less than the diameter of the guide portion of the flow path.

5. A pressure exchange chamber pumping system comprising: at least one pressure exchange chamber having a medium valve arrangement at one end thereof and a driving fluid valve arrangement at an opposite end thereof, at least one of the valve arrangements including at least one valve as claimed in claim 1.

6. The pressure exchange chamber pumping system of claim 5, in which at least a driving fluid inlet valve of the driving fluid valve arrangement is a valve as claimed in claim 1.

7. The pressure exchange chamber pumping system of claim 5, which includes a plurality of pressure exchange chambers arranged in parallel.

* * * * *